(12) United States Patent
Roksz

(10) Patent No.: US 7,791,747 B2
(45) Date of Patent: Sep. 7, 2010

(54) SECURITY OF PRINTED DOCUMENTS THROUGH END USER PRESENCE SENSING

(75) Inventor: Vaughn T. Roksz, Newton, MA (US)

(73) Assignee: International Business Machines Corporation, Armonk, NY (US)

( * ) Notice: Subject to any disclaimer, the term of this patent is extended or adjusted under 35 U.S.C. 154(b) by 1457 days.

(21) Appl. No.: 11/104,340

(22) Filed: Apr. 12, 2005

(65) Prior Publication Data

US 2006/0227371 A1  Oct. 12, 2006

(51) Int. Cl.
G06F 15/00 (2006.01)
G06K 1/00 (2006.01)
G06K 15/00 (2006.01)
G06F 3/12 (2006.01)

(52) U.S. Cl. .................................. 358/1.14; 358/1.15
(58) Field of Classification Search ............... 358/1.15, 358/1.14, 1.1, 1.13, 402, 403, 426.02; 340/572.1, 340/5.81
See application file for complete search history.

(56) References Cited

U.S. PATENT DOCUMENTS

| | | | |
|---|---|---|---|
| 5,970,218 A | * | 10/1999 | Mullin et al. ............ 358/1.15 |
| 6,317,823 B1 | * | 11/2001 | Wakai et al. ............ 712/220 |
| 6,329,908 B1 | | 12/2001 | Frecska |
| 0,043,042 A1 | | 3/2003 | Moores, Jr. et al |
| 2002/0089434 A1 | | 7/2002 | Ghazarian |
| 2002/0165758 A1 | | 11/2002 | Hind et al. |
| 2004/0124982 A1 | | 7/2004 | Kovach |
| 2004/0190038 A1 | * | 9/2004 | Shahindoust ............ 358/1.14 |
| 2004/0217864 A1 | | 11/2004 | Nowak et al. |
| 2005/0270567 A1 | * | 12/2005 | Du et al. ............ 358/1.15 |
| 2006/0146839 A1 | * | 7/2006 | Hurwitz et al. ............ 370/401 |
| 2008/0238613 A1 | * | 10/2008 | Salva Calcagno ......... 340/5.83 |

\* cited by examiner

Primary Examiner—Douglas Q Tran
(74) Attorney, Agent, or Firm—Ayla A. Lari, Esq.; Steven M. Greenberg, Esq.; Carey, Rodriguez, Greenberg & Paul, LLP

(57) ABSTRACT

A method, system and apparatus for improving the security of printed documents through end user presence sensing. In this regard, a system for improving the security of printed documents through end user presence detection can include a data store having records correlating end users with print jobs for a workgroup printer, presence detection circuitry disposed in proximity to the workgroup printer, and security management logic coupled to the data store and the presence detection circuitry. Notably, the security management logic can be programmed to determine when end users associated with print jobs recorded in the data store have not come into proximity of the workgroup printer.

18 Claims, 2 Drawing Sheets

SECURITY OF PRINTED DOCUMENTS THROUGH END USER PRESENCE SENSING

BACKGROUND OF THE INVENTION

1. Statement of the Technical Field

The present invention relates to the field of document printing and more particularly to the security of printed documents.

2. Description of the Related Art

Network security has become the driving issue for information technologists in the management of information technology resources. Information technologists face a constant barrage of threats which range from network intrusions to viruses to rogue wireless access points and spam. Oftentimes, security threats within the enterprise are not the result of an independent, un-trusted force which cannot be controlled. Rather, in many instances, trusted parties within the enterprise shoulder the blame for security lapses through a lack of understanding of security concerns or sheer carelessness. Examples include the rampant distribution of corporate e-mail addresses, the careless activation of mail attachments, and the activation of open wireless access points.

One basic form of an avoidable security lapse relates to the printing of sensitive documents to a workgroup printer. In the printed document context, in many instances, end users print sensitive documents to an assigned network printer. Due to the distance between end users and an assigned network printer, however, it is possible that a substantial period of time can elapse from printing a sensitive document to the retrieval of the printed sensitive document. In the interim period, it is possible that an unauthorized party can access confidential or otherwise sensitive information disposed within the printed document. In some instances, the document can be removed by the unauthorized party.

To address this simple breach of security, several high profile providers of information technology and information technology consulting services have published guidelines for positioning workgroup printers in a private and controlled area, away from open spaces. More advanced solutions employ the use of personal identification codes which must be provided manually by the printing user before the workgroup printer will release a print job. Even more advanced solutions employ smartcards which, when inserted into a computing device coupled to the workgroup printer, permit the release of a printed document associated with the user encoded in the smartcard.

Notwithstanding, all of the foregoing solutions do not address the problem of a printed document which sits unattended within the workgroup printer (whether printed or not), or the worse case of an abandoned print job. Moreover, information technologists cannot accurately monitor the document retrieval behavior of end users in the enterprise. At best, an information technologist can monitor the workgroup printer to manually identify abandoned or lingering print jobs which have not been claimed. While corporate computing guidelines for many an enterprise specify a maximum period of time in which a document is to remain unclaimed at a workgroup printer, there is no guarantee that the guideline is followed by the end users in the enterprise.

SUMMARY OF THE INVENTION

The present invention addresses the deficiencies of the art in respect to printed document security and provides a novel and non-obvious method, system and apparatus for improving the security of printed documents through end user presence sensing. In this regard, a system for improving the security of printed documents through end user presence detection can include a data store having records correlating end users with print jobs for a workgroup printer, presence detection circuitry disposed in proximity to the workgroup printer, and security management logic coupled to the data store and the presence detection circuitry. Notably, the security management logic can be programmed to determine when end users associated with print jobs recorded in the data store have not come into proximity of the workgroup printer.

The data store can include a table correlating end users with print jobs, and a separate table correlating end users with end user identifiers disposed in corresponding presence detection transmitters. The presence detection circuitry can be a radio frequency identification (RFID) detection system. The security management logic can be programmed to notify end users associated with print jobs recorded in the data store when the end users have not come into proximity of the workgroup printer within a threshold period of time. Finally, the security management logic can be disposed in a print server for the workgroup printer, or the security management logic can be disposed in a computing device coupled to a print server for the workgroup printer.

A method for improving the security of printed documents through end user presence detection can include receiving print job notifications for end users who have requested print jobs from a workgroup printer in a data communications network and associating the end users with corresponding ones of the requested print job notifications. A presence of at least one of the end users can be detected in proximity to the workgroup printer. Consequently, it can be determined when individual ones of the end users associated with the requested print jobs have not come into proximity of the workgroup printer.

The associating step can include writing a record in a data store correlating each received print job notification with a requesting end user. The detecting step can include sensing an RFID tag in proximity to the workgroup printer. The determining step further can include transmitting a notification to the individual ones of the end users associated with the requested print jobs who have not come into proximity of the workgroup printer. Also, the determining step further can include logging instances when the individual ones of the end users associated with the requested print jobs have not come into proximity of the workgroup printer within a threshold period of time.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE PREFERRED EMBODIMENTS

The present invention is a method, system and apparatus for improving the security of printed documents through end user presence detection. In accordance with the present invention, a workgroup printer can receive print jobs from one or more end users in the workgroup. Each received print job can be associated with one of the end users and a record of the print job can be stored along with a reference to the associated end user. Presence detection circuitry disposed in proximity to the workgroup printer can detect the presence of end users. When an end user is detected in proximity to the workgroup printer, the record or records of print jobs associated with the proximate end user can be removed according to the presumption that the end user will have retrieved the associated print jobs.

Periodically, the records of print jobs can be analyzed to detect lingering print jobs which are likely not to have been retrieved by associated end users. Specifically, the records can be scanned unclaimed print jobs which have lingered for a threshold period of time. For each lingering print job, remedial measures can be undertaken. These remedial measures can include by way of non-limiting example, the logging of the lingering print jobs for analysis by a network administrator, and the transmission of a notification to each associated end user of the lingering print jobs.

Figure 1:
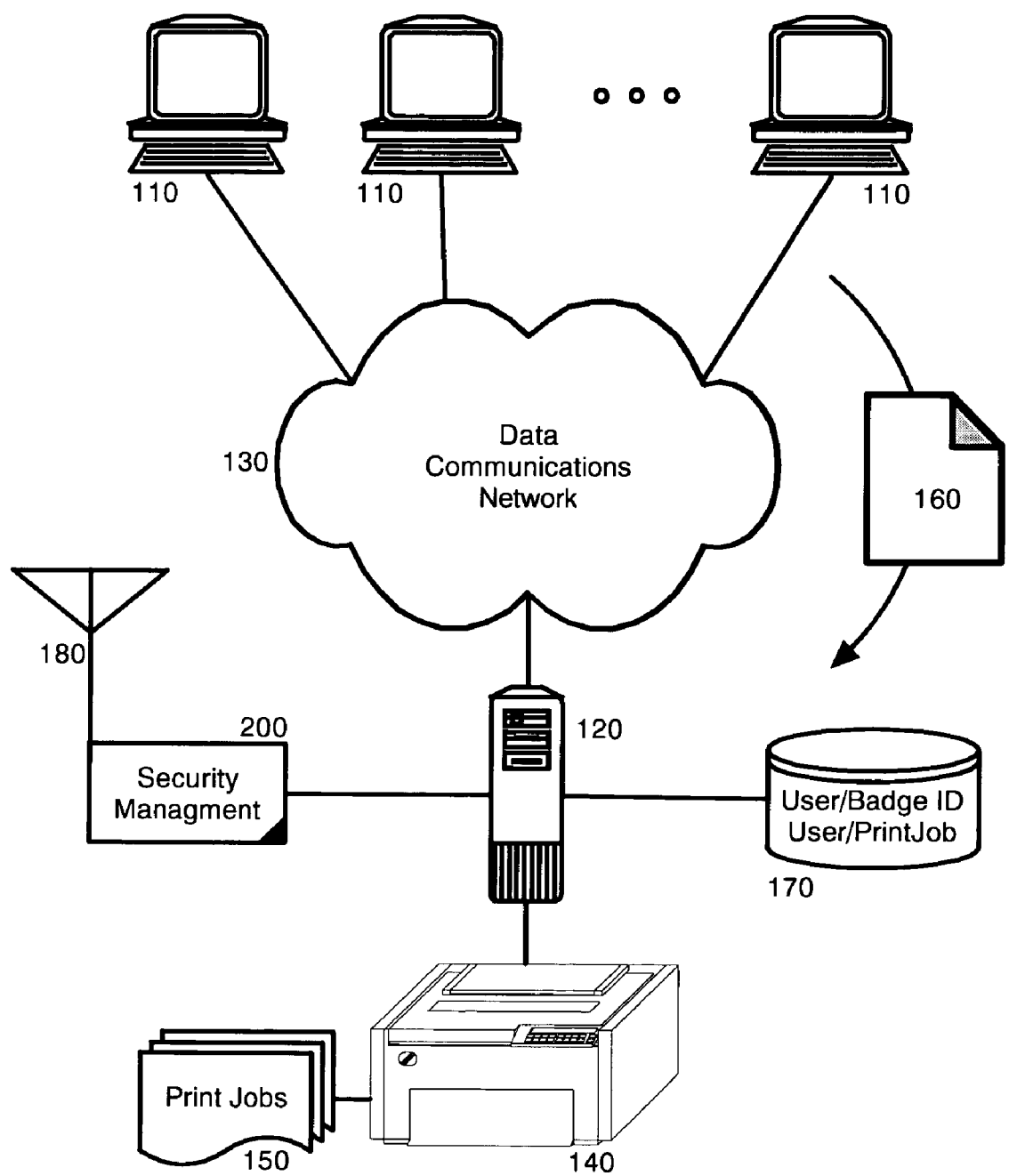
FIG. 1 is a schematic illustration of a computer network having a workgroup printer configured for enhanced security based upon presence detection in accordance with the inventive arrangements; and, FIG. 2 is a flow chart illustrating a process for enhanced security based upon presence detection in the computer network of FIG. 1.

In further illustration of a particular aspect of the invention, FIG. 1 is a schematic illustration of a computer network having a workgroup printer configured for enhanced security based upon presence detection. The computer network can include one or more end user computing devices 110 communicatively linked to a server computing device 120 over a data communications network, the communicative linkage forming a workgroup. A workgroup printer 140 can be coupled to the data communications network 130 and optionally the workgroup printer 140 can be coupled to the server computing device 120 where the server computing device 120 acts as a print server to the workgroup printer 140.

The workgroup printer can receive print job requests 150 from the end user computing devices 110 which requests 150 can be processed as print jobs 150 resulting in printed documents (not shown) which are produced by the workgroup printer 140. Importantly, a data store 170 can be coupled to the server computing device 120. The data store 170 can include a table correlating end users utilizing the end user computing devices 110 with user identifiers. The data store 170 further can include a table correlating end users with print jobs 150 received by the workgroup printer 140.

In accordance with the present invention, presence detecting circuitry 180 can be coupled to the server computing device 120 along with security management logic 200. The presence detecting circuitry 180 can include a receiver arranged to detect one or more presence sensors in proximity to the presence detecting circuitry 180. As an example, the presence detecting circuitry 180 can detect a radio frequency (RF) sensor associated with an end user which sensor can broadcast a user identifier for the end user. In one instance, the presence detecting circuitry 180 can be a radio frequency identification (RFID) detection system configured to detect proximate RFID tags.

The security management logic 200 can be programmed to record print jobs in association with requesting end users in the data store 170. The security management logic 200 further can be programmed to remove recorded ones of the print jobs 150 for end users from the data store 170 when the end users come into proximity of the presence detecting circuitry 180. Finally, periodically the security management logic 200 can scan the records in the data store 170 which include references to print jobs 150 which have remained in the data store 170 for a threshold period of time. In response to detecting lingering ones of the print jobs 150, the security management logic 200 can undertake remedial measures including a logging of the lingering ones of the print jobs 150 and a notification of associated end users of the lingering ones of the print jobs 150. The notification can include providing to the associated en users an electronic mail message, instant message or alert message displayed in a dialog box.

Figure 2:
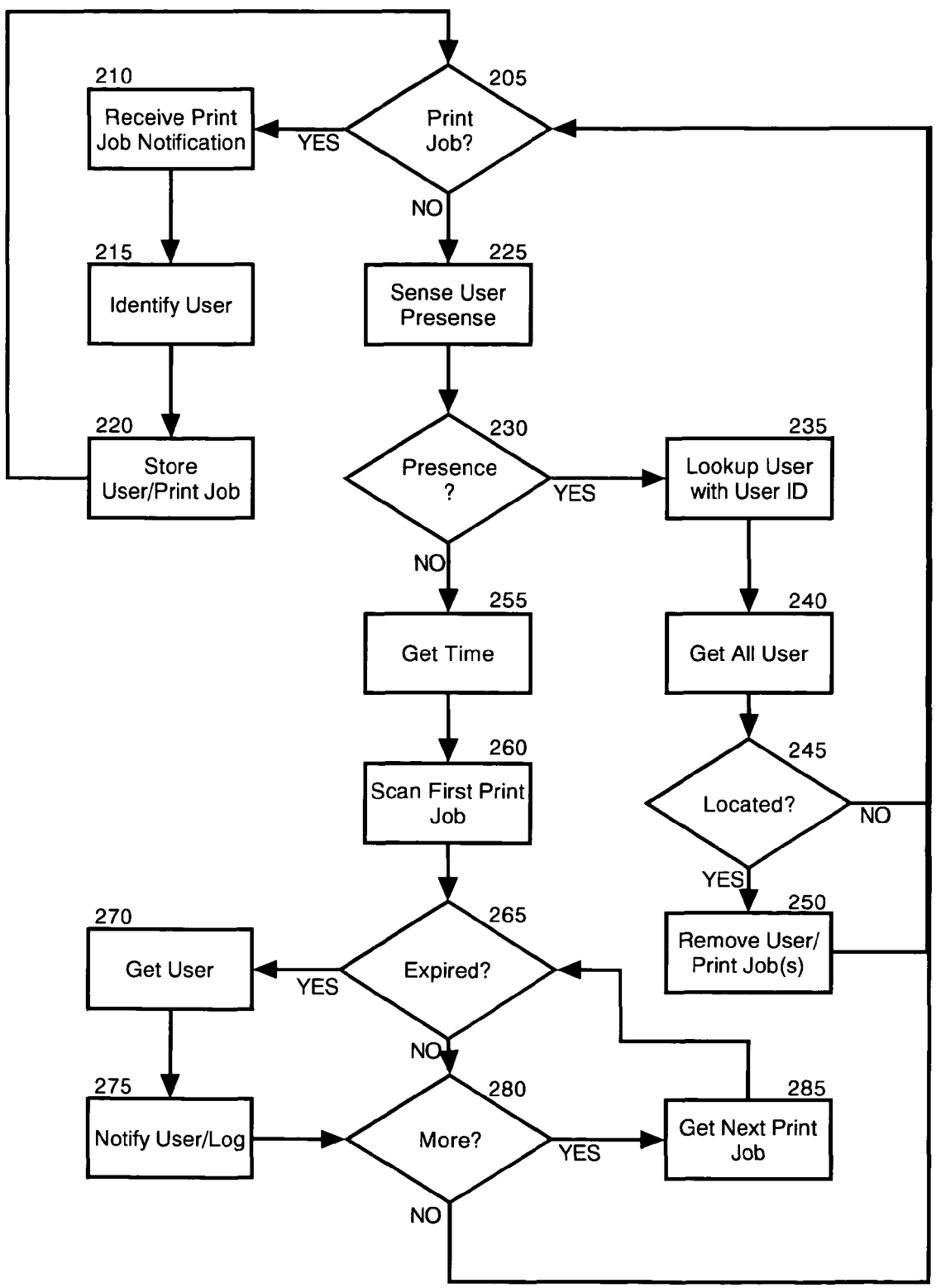

As an example of the operation of the security management logic 200, FIG. 2 is a flow chart illustrating a process for enhanced security based upon presence detection in the computer network of FIG. 1. Beginning in decision block 205, it can be determined whether a print job has been requested. If so, in block 210 the print job notification can be received for processing and in block 215, the user requesting the print job can be identified. Subsequently, in block 220 a record can be written to the data store which correlates the identified user with the requested print job. The record further can include a relative or absolute time relating to when the request had been received.

In decision block 205, if a print job request has not been received, in block 225 the presence sensing circuitry can detect the presence of an end user. If in decision block 230 the presence of an end user can be detected, in block 235 the end user for the user identifier associated with the detected end user can be determined by reference to a table in the data store. In block 240, all print jobs associated with the end user can be located in the data store. If, in decision block 245, print jobs can be located for the end user, the records of the print jobs can be removed from the data store in block 250.

Returning to decision block 230, if the presence of an end user is not detected, in block 255, the time can be determined and in block 260, the first print job in the data store can be scanned to determine how much time has elapsed since the print job request had been received. In decision block 265, if the allowable time for the print job request to remain pending has elapsed, in block 270 the end user associated with the print job can be obtained and the end user can be notified in block 275. Also, the lingering print job and the end user identity can be logged for subsequent analysis. Finally, the process can repeat in decision block 280 and 285 for each other record in the data store.

The present invention can be realized in hardware, software, or a combination of hardware and software. An implementation of the method and system of the present invention can be realized in a centralized fashion in one computer system, or in a distributed fashion where different elements are spread across several interconnected computer systems. Any kind of computer system, or other apparatus adapted for carrying out the methods described herein, is suited to perform the functions described herein.

A typical combination of hardware and software could be a general purpose computer system with a computer program that, when being loaded and executed, controls the computer system such that it carries out the methods described herein.

The present invention can also be embedded in a computer program product, which comprises all the features enabling the implementation of the methods described herein, and which, when loaded in a computer system is able to carry out these methods.

Computer program or application in the present context means any expression, in any language, code or notation, of a set of instructions intended to cause a system having an information processing capability to perform a particular function either directly or after either or both of the following a) conversion to another language, code or notation; b) reproduction in a different material form. Significantly, this invention can be embodied in other specific forms without departing from the spirit or essential attributes thereof, and accordingly, reference should be had to the following claims, rather than to the foregoing specification, as indicating the scope of the invention.

I claim:

1. A system for improving the security of printed documents through end user presence detection, the system comprising:
    a data store having records correlating end users with print jobs for a workgroup printer;
    presence detection circuitry disposed in proximity to said workgroup printer;
    and, security management logic coupled to said data store and said presence detection circuitry and programmed to determine when end users associated with print jobs recorded in said data store have not come into proximity of said workgroup printer.

2. The system of claim 1, wherein said data store comprises a table correlating end users with print jobs, and a separate table correlating end users with end user identifiers disposed in corresponding presence detection transmitters.

3. The system of claim 1, wherein said presence detection circuitry is a radio frequency identification (RFID) detection system.

4. The system of claim 1, wherein said security management logic is programmed to notify end users associated with print jobs recorded in said data store when said end users have not come into proximity of said workgroup printer within a threshold period of time.

5. The system of claim 1, wherein said security management logic is disposed in a print server for said workgroup printer.

6. The system of claim 1, wherein said security management logic is disposed in a computing device coupled to a print server for said workgroup printer.

7. A method for improving the security of printed documents through end user presence detection, the method comprising the steps of:
    receiving print job notifications in a workgroup printer from end user computing devices for end users who have requested print jobs from the workgroup printer in a data communications network;
    associating said end users with corresponding ones of said requested print jobs;
    detecting a presence of at least one of said end users in proximity to said workgroup printer; and,
    determining when individual ones of said end users associated with said requested print jobs have not come into proximity of said workgroup printer.

8. The method of claim 7, wherein said associating step comprises the step of writing a record in a data store correlating each received print job notification with a requesting end user.

9. The method of claim 7, wherein said detecting step comprises the step of sensing a radio frequency identifier (RFID) tag in proximity to said workgroup printer.

10. The method of claim 7, wherein said determining step further comprises the step of transmitting a notification to said individual ones of said end users associated with said requested print jobs who have not come into proximity of said workgroup printer.

11. The method of claim 10, wherein said transmitting step comprises the step of providing one of an electronic mail message, instant message and alert message displayed in a dialog box to said individual ones of said end users associated with said requested print jobs who have not come into proximity of said workgroup printer.

12. The method of claim 7, wherein said determining step further comprises the step of logging instances when said individual ones of said end users associated with said requested print jobs have not come into proximity of said workgroup printer within a threshold period of time.

13. A computer readable storage having stored thereon a computer program for improving the security of printed documents through end user presence detection, the computer program comprising a routine set of instructions which when executed by a machine causes the machine to perform the steps of:
    receiving print job notifications for end users who have requested print jobs from a workgroup printer in a data communications network;
    associating said end users with corresponding ones of said requested print jobs;
    detecting a presence of at least one of said end users in proximity to said workgroup printer;
    and, determining when individual ones of said end users associated with said requested print jobs have not come into proximity of said workgroup printer.

14. The machine readable storage of claim 13, wherein said associating step comprises the step of writing a record in a data store correlating each received print job notification with a requesting end user.

15. The machine readable storage of claim 13, wherein said detecting step comprises the step of sensing a radio frequency identifier (RFID) tag in proximity to said workgroup printer.

16. The machine readable storage of claim 13, wherein said determining step further comprises the step of transmitting a notification to said individual ones of said end users associated with said requested print jobs who have not come into proximity of said workgroup printer.

17. The machine readable storage of claim 13, wherein said transmitting step comprises the step of providing one of an electronic mail message, instant message and alert message displayed in a dialog box to said individual ones of said end users associated with said requested print jobs who have not come into proximity of said workgroup printer.

18. The machine readable storage of claim 13, wherein said determining step further comprises the step of logging instances when said individual ones of said end users associated with said requested print jobs have not come into proximity of said workgroup printer within a threshold period of time.

* * * * *